United States Patent
Girt et al.

(10) Patent No.: US 6,852,426 B1
(45) Date of Patent: Feb. 8, 2005

(54) HYBRID ANTI-FERROMAGNETICALLY COUPLED AND LAMINATED MAGNETIC MEDIA

(75) Inventors: Erol Girt, Berkeley, CA (US); Mariana Rodica Munteanu, Santa Clara, CA (US); Hans Jürgen Richter, Palo Alto, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/106,072

(22) Filed: Mar. 27, 2002

Related U.S. Application Data
(60) Provisional application No. 60/342,635, filed on Dec. 20, 2001.

(51) Int. Cl.$^7$ .................................................. G11B 5/66
(52) U.S. Cl. ........................ 428/611; 428/637; 428/667; 428/668; 428/675; 428/678; 428/215; 428/216; 428/336; 428/694 TS; 428/694 TM
(58) Field of Search .................... 427/128; 428/216, 428/336, 611, 632, 637, 667, 668, 675, 678, 215, 332, 694 TS, 694 TM (56) References Cited

U.S. PATENT DOCUMENTS

| | | | |
|---|---|---|---|
| 5,051,288 A | | 9/1991 | Ahlert et al. |
| 6,280,813 B1 | | 8/2001 | Carey et al. |
| 6,372,330 B1 | * | 4/2002 | Do et al. ................... 428/212 |
| 6,383,668 B1 | * | 5/2002 | Fullerton et al. .... 428/694 TM |
| 6,645,646 B1 | * | 11/2003 | Umeda et al. ......... 428/694 TS |
| 2001/0051287 A1 | * | 12/2001 | Kikitsu et al. ....... 428/694 ML |
| 2001/0051288 A1 | * | 12/2001 | Iwasaki et al. ......... 428/694 TM |
| 2002/0045070 A1 | * | 4/2002 | Sakakima et al. ..... 428/694 TS |
| 2002/0098390 A1 | * | 7/2002 | Do et al. ................ 428/694 TS |
| 2002/0167769 A1 | * | 11/2002 | Saito et al. ............ 360/324.11 |
| 2003/0008177 A1 | * | 1/2003 | Bian et al. ............. 428/694 TS |
| 2003/0008178 A1 | * | 1/2003 | Bian et al. ............. 428/694 TS |
| 2003/0090831 A1 | * | 5/2003 | Doerner et al. .......... 360/97.01 |

OTHER PUBLICATIONS

Abarra, E., Inomata, A., Sato, H., Okamoto, I., and Y. Mizoshita (App. Phys. Let., 77(16), 2000, 2581–2583).*

* cited by examiner

*Primary Examiner*—Kevin M. Bernatz
(74) *Attorney, Agent, or Firm*—McDermott Will & Emery LLP

(57) ABSTRACT

A high areal recording density longitudinal magnetic recording medium having improved thermal stability and signal-to-medium noise ratio ("SMNR"), comprises:
(a) a non-magnetic substrate having at least one surface; and
(b) a layer stack overlying the at least one surface, comprising a plurality of vertically spaced-apart ferromagnetic layers, each vertically adjacent pair of ferromagnetic layers being spaced-apart by a respective non-magnetic spacer layer, wherein:
 (i) at least one of the plurality of vertically adjacent, spaced-apart pairs of ferromagnetic layers forms an anti-ferromagnetically coupled media ("AFC") component of the magnetic recording medium; and
 (ii) at least one of the plurality of vertically adjacent, spaced-apart pairs of ferromagnetic layers forms a laminated media ("LM") component of the magnetic recording medium.

21 Claims, 4 Drawing Sheets

HYBRID ANTI-FERROMAGNETICALLY COUPLED AND LAMINATED MAGNETIC MEDIA

CROSS-REFERENCE TO PROVISIONAL APPLICATION

This application claims priority from U.S. provisional patent application Ser. No. 60/342,635 filed Dec. 20, 2001, the entire disclosure of which is incorporated herein by reference.

FIELD OF THE INVENTION

The present invention relates to very high areal density magnetic recording media, such as hard disks, exhibiting increased stability and signal-to-media noise ratio (SMNR), with reduced $PW_{50}$. More particularly, the present invention relates to improved longitudinal magnetic recording media including an anti-ferromagnetically coupled (AFC) portion and a laminated (LM) portion.

BACKGROUND OF THE INVENTION

Magnetic recording ("MR") media and devices incorporating same are widely employed in various applications, particularly in the computer industry for data/information storage and retrieval applications, typically in disk form. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

Figure 1:
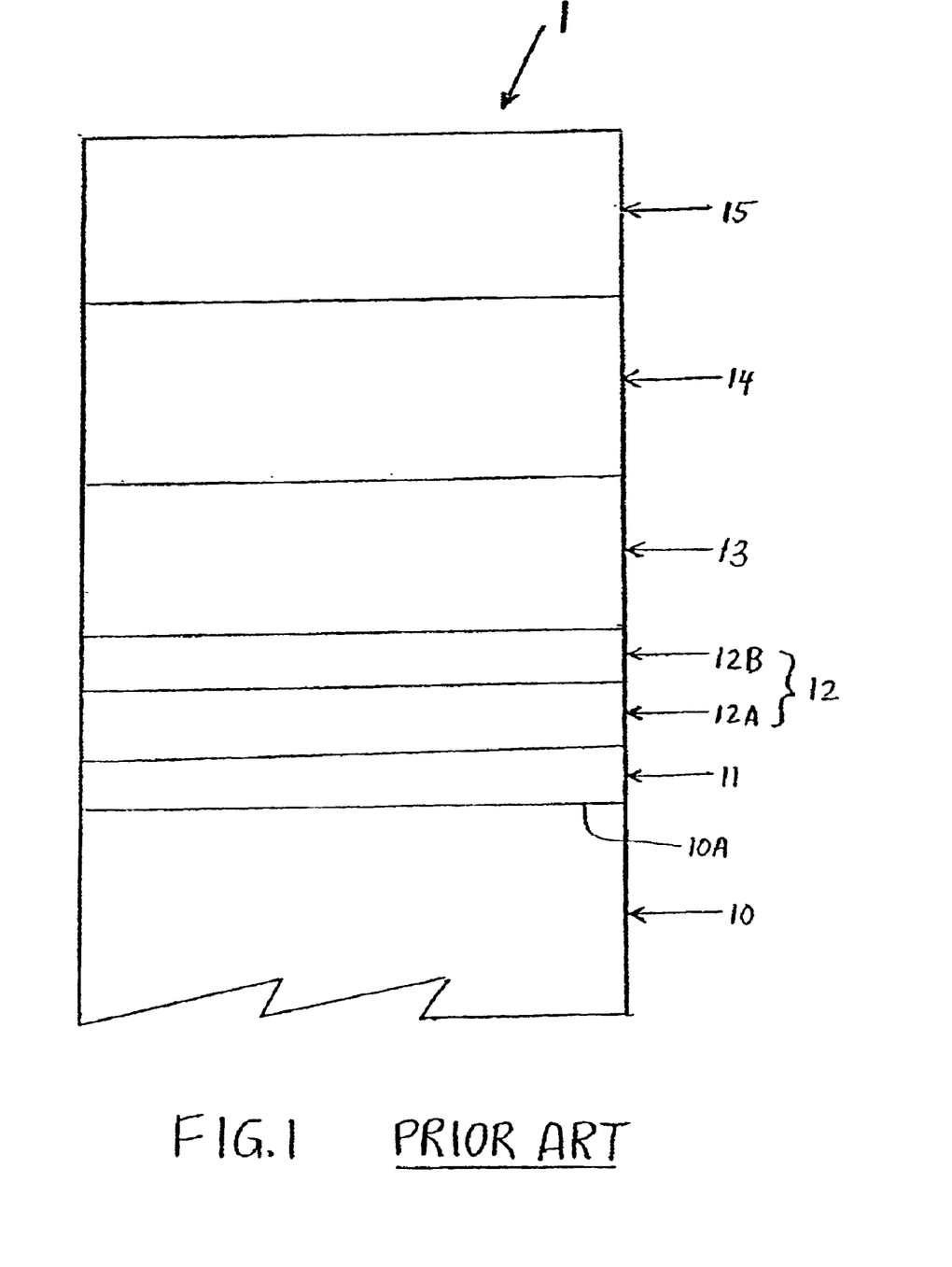
FIG. 1 schematically illustrates, in simplified cross-sectional view, a portion of a conventional thin-film, longitudinal-type magnetic disk recording medium.

A portion of a conventional longitudinal recording, thin-film, hard disk-type magnetic recording medium 1 commonly employed in computer-related applications is schematically illustrated in FIG. 1 in simplified cross-sectional view, and comprises a substantially rigid, non-magnetic metal substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy; a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Efforts are continually being made with the aim of increasing the areal recording density, i.e., the bit density, or bits/unit area, and signal-to-medium noise ratio (SMNR) of the magnetic media. However, severe difficulties are encountered when the bit density of longitudinal media is increased above about 20–50 $Gb/in^2$ in order to form ultra-high recording density media, such as thermal instability, when the necessary reduction in grain size exceeds the superparamagnetic limit. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, including that presented by the superparamagnetic limit, is to increase the crystalline anisotropy, thus the squareness of the magnetic bits, in order to compensate for the smaller grain sizes. However, this approach is limited by the field provided by the writing head.

Another proposed solution to the problem of thermal instability of very fine-grained magnetic recording media is to provide a stacked layer structure wherein stabilization of a stacked pair if of ferromagnetic layers is provided via coupling of a ferromagnetic recording layer with another ferromagnetic layer or an anti-ferromagnetic layer. In this regard, it has been recently proposed (E. N. Abarra et al., IEEE Conference on Magnetics, Toronto, April 2000) to provide stabilized magnetic recording media (hereinafter "AFC" media) comprised of at least a pair of ferromagnetic layers which are anti-ferromagnetically-coupled means of an interposed thin, non-magnetic spacer layer. The coupling is presumed to increase the effective volume of each of the magnetic grains, thereby increasing their stability.

The strength of the coupling between stacked ferromagnetic layers can be described in terms of the total exchange energy. For a pair of ferromagnetic layers separated by a non-magnetic spacer layer, the total exchange energy generally results from RKKY-type interaction (i.e., oscillation from anti-ferromagnetic to ferromagnetic with increasing spacer film thickness), dipole-dipole interactions between grains of the ferromagnetic layers across the spacer layer (which favors anti-ferromagnetic alignment of adjacent grains across the spacer layer), and direct exchange interaction (which favors ferromagnetic alignment of the ferromagnetic layers). In AFC media the thickness of the spacer layer is chosen to maximize the anti-ferromagnetic coupling between the ferromagnetic layers. According to this approach, the total exchange energy between the ferromagnetic layer pairs is a key parameter in determining the increase in stability.

Still another proposed solution to the problem of thermal instability of very fine-grained magnetic recording media is to provide stabilization, hence increased SMNR, via formation of laminated media (hereinafter "LM"), as for example, disclosed in U.S. Pat. No. 5,051,289, the entire disclosure of which is incorporated herein by reference. Such LM comprise typically two or more stacked ferromagnetic layers separated by a non-magnetic spacer layer, where, in contrast to AFC media, the spacer layer generally is thicker and is provided for physically separating, rather than coupling, a pair of vertically stacked ferromagnetic layers; i.e., the strength of any magnetic coupling between the stacked ferromagnetic layers is smaller than the magnetic energies of the grains of each of the ferromagnetic layers.

It is also considered that improvement in the SMNR of longitudinal magnetic recording media required for providing a further increase in areal recording density cannot be obtained by further decrease in average grain volume ($V_{av.}$). The attainable value of the SMNR of magnetic recording media increases: (1) in approximate relation to $N^{1/2}$, where N is the number of grains/recorded transition; and (2) with decreasing magnetic remanence-thickness product ($M_rt$) of the media. In either instance, however, the increase in SMNR leads to a smaller energy barrier ($K_uV$) resisting magnetization reversal due to thermal agitation. The reduction in volume (V) can be partially offset by increasing the anisotropy ($K_u$) of the ferromagnetic material of the media; however, increase of the latter is limited by the strength of the currently available writing fields.

As indicated supra, different designs of the above-described LM and AFC media have been proposed for further increasing the areal recording density of longitudinal magnetic recording media. In LM, the number of grains/magnetic transition increases by a factor n, where n is the number of stacked ferromagnetic layers, such that the SMNR is expected to increase in approximate proportion to $n^{1/2}$. However, obtaining stable LM with the requisite narrow width at one-half the peak height hereinafter "$PW_{50}$") for high areal recording densities is difficult with the currently available writing fields. On the other hand, in AFC media, stability of the main ferromagnetic recording layer increases: (1) due to the decrease in the demagnetization field upon storage which is proportional to the net $M_rt$, which is equal to the $M_rt$ of the main layer ("ML") minus the $M_rt$ of the bottom AFC layer ("BL"), i.e., $(M_rt)_{ML}-(M_rt)_{BL}$ and (2) due to the increase in the energy barrier due to coupling (H. J. Richter and E. Girt, submitted to *Phys. Rev. Lett.*), which stability increase of the main recording layer can be "traded off" against the decreased average grain volume ($V_{av.}$) in the main recording layer.

Notwithstanding the obtainment of improved thermal stability and/or SMNR afforded by each of the above-described AFC and LM approaches, the continuously increasing requirements for high storage density magnetic media exhibiting high SMNR and improved thermal stability necessitate an even further increase in the performance of such longitudinal-type magnetic recording media.

The present invention, therefore, addresses and solves problems attendant upon forming very high areal recording density, thermally stable, high SMNR longitudinal magnetic recording media, e.g., in the form of hard disks, which media combine the advantages afforded by both of the above-described AFC and LM approaches, while maintaining full compatibility with all aspects of conventional automated manufacturing technology therefor. Moreover, manufacture and implementation of the present invention can be obtained at a cost comparable to that of existing technology/methodology.

DISCLOSURE OF THE INVENTION

An advantage of the present invention is an improved high areal recording density, longitudinal magnetic recording medium having enhanced thermal stability and increased SMNR.

Another advantage of the present invention is an improved high areal density, longitudinal magnetic recording medium comprising anti-ferromagnetically coupled (AFC) and laminated media (LM) components.

Yet another advantage of the present invention is method of fabricating an improved high areal recording density, longitudinal magnetic recording medium having enhanced thermal stability and increased SMNR.

Still another advantage of the present invention is a method of fabricating an improved high areal density, longitudinal magnetic recording medium comprising anti-ferromagnetically coupled (AFC) and laminated media (LM) components.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a high areal recording density longitudinal magnetic recording medium having improved thermal stability and signal-to-medium noise ratio ("SMNR"), comprising:

(a) a non-magnetic substrate having at least one surface; and (b) a layer stack overlying the at least one surface, the layer stack comprising a plurality of vertically spaced-apart ferromagnetic layers, each vertically adjacent pair of ferromagnetic layers being spaced apart by a respective non-magnetic spacer layer, wherein:

(i) at least one of the plurality of vertically adjacent, spaced-apart pairs of ferromagnetic layers forms an anti-ferromagnetically coupled media ("AFC") component of the magnetic recording medium; and (ii) at least one of the plurality of vertically adjacent, spaced-apart pairs of ferromagnetic layers forms a laminated media ("LM") component of the magnetic recording medium.

In accordance with embodiments of the present invention, the at least one LM component (ii) is positioned in the layer stack (b) above the at least one AFC component (i); the thickness of the non-magnetic spacer layer of the at least one AFC component (i) is such that the anti-ferromagnetic coupling between the respective pair of vertically spaced-apart ferromagnetic layers are maximized; and the thickness of the non-magnetic spacer layer of the at least one LM component (ii) is such that the energy of any magnetic coupling between the respective pair of vertically spaced-apart ferromagnetic layers is smaller than the magnetic energy of the magnetic grains in the ferromagnetic layers.

According to certain embodiments of the present invention, the thickness of the non-magnetic spacer layer of the AFC component (i) is in the range from about 2 to about 20 Å; and the thickness of the non-magnetic spacer layer of the LM component (ii) is in the range from about 4 to about 40 Å. According to preferred embodiments of the invention, the thickness of the non-magnetic spacer layer of the AFC component (i) is in the range from about 5 to about 10 Å; the thickness of the non-magnetic spacer layer of the LM component (ii) is in the range from about 10 to about 30 Å; and in either instance each of the non-magnetic spacer layers comprises a material selected from the group consisting of Ru, Rh, Ir, Cr, Cu, Re, V, and their alloys.

In accordance with other embodiments of the present invention, the magnetic recording medium further comprises: a ferromagnetic interface layer at at least one interface between the non-magnetic spacer layer and the respective pair of vertically spaced-apart ferromagnetic layers of the at least one AFC component (i) for increasing the coupling between the ferromagnetic layers; wherein each of the ferromagnetic interface layers comprises an about 1 monolayer thick to an about 40 Å thick layer of a ferromagnetic material having a saturation magnetization value $M_s>400$ emu/cc, e.g., each of the ferromagnetic interface layers comprises at least one of Co and Fe or their alloys with at least one of Pt, Cr, B, Ni, Ru, Mo, Si, Ge, Nb, and Ta, wherein the concentration(s) of the at least one of Co and Fe in the alloy is (are) constant or varies (vary) across the thickness of the interface layer(s) from high near an interface with the non-magnetic spacer layer to low near an interface with a respective ferromagnetic layer.

According to certain embodiments of the present invention, the thickness of the lower ferromagnetic layer of the at least one AFC component (i) proximal the at least one surface of the substrate (a) is in the range from about 2 to about 80 Å; the thickness of the upper ferromagnetic layer of the at least one AFC component (i) and each of the pair of vertically spaced-apart ferromagnetic layers of the at least one LM component (ii) is in the range from about 30 to about 200 Å; and each of the plurality of vertically adjacent, spaced-apart pairs of ferromagnetic layers of the layer stack (b) comprises a CoCr alloy or a CoCr alloy with at least one additional element selected from the group consisting of Pt, Ta, B, Mo, Ru, Si, Ge, Nb, Fe, and Ni.

In accordance with further embodiments of the present invention, the magnetic recording medium further comprises:

(c) seed and underlayers between the at least one surface of the non-magnetic substrate (a) and the layer stack (b) for controlling the crystallographic texture of the ferromagnetic layers; and (d) protective overcoat and lubricant topcoat layers provided on an upper surface of the layer stack (b); wherein: the seed layer is from about 10 to about 1,000 Å thick and comprises an amorphous or fine-grained material selected from the group consisting of Ni—Al, Fe—Al, Cr—Ti, Cr—Ta, Ta, Ta—W, Ru—Al, Co—Ti, and TaN; and the underlayer is from about 10 to about 300 Å thick and comprises a polycrystalline layer of Cr or a Cr-based alloy.

Another aspect of the present invention is a method of forming a high areal density magnetic recording medium having improved thermal stability and signal-to-media noise ratio ("SMNR"), comprising steps of:

(a) providing a non-magnetic substrate having at least one surface adapted for layer formation thereover; and (b) forming a layer stack overlying the at least one surface, the layer stack comprising a plurality of vertically spaced-apart ferromagnetic layers, vertically adjacent pairs of the ferromagnetic layers being spaced apart by respective non-magnetic spacer layers, wherein:

at least one of the plurality of vertically adjacent, spaced-apart pairs of ferromagnetic layers forms an anti-ferromagnetically coupled media ("AFC") component of the magnetic recording medium; and at least one of the plurality of vertically adjacent, spaced-apart pairs of ferromagnetic layers forms a laminated media ("LM") component of the magnetic recording medium.

According to embodiments of the present invention, step (b) comprises:

($b_1$) forming the layer stack such that the at least one LM component is positioned in the layer stack above the at least one AFC component;

($b_2$) forming the non-magnetic spacer layer of the at least one AFC component at a thickness such that the anti-ferromagnetic coupling between the respective pair of vertically spaced-apart ferromagnetic layers is maximized; and ($b_3$) forming the non-magnetic spacer layer of the at least one LM component at a thickness such that the energy of any magnetic coupling between the respective pair of vertically spaced-apart ferromagnetic layers is smaller than the magnetic energy of the magnetic grains in the ferromagnetic layers.

In accordance with certain embodiments of the present invention, step (b) comprises:

($b_2$) forming the non-magnetic spacer layer of the AFC component at a thickness in the range from about 2 to about 20 Å; and ($b_3$) forming the non-magnetic spacer layer of the LM component at a thickness in the range from about 4 to about 40 Å, wherein:

each of the non-magnetic spacer layers of the layer stack comprises a material selected from the group consisting of Ru, Rh, Ir, Cr, Cu, Re, V, and their alloys.

According to certain other embodiments of the present invention, step (b) further comprises:

($b_4$) forming a ferromagnetic interface layer at at least one interface between the non-magnetic spacer layer and the respective pair of vertically spaced-apart ferromagnetic layers of the at least one AFC component for increasing the coupling between the ferromagnetic layers, wherein:

each of the ferromagnetic interface layers comprises an about 1 monolayer thick to an about 40 Å thick layer of a ferromagnetic material having a saturation magnetization value $M_s>400$ emu/cc, the ferromagnetic material comprising at least one of Co and Fe or their alloys with at least one of Pt, Cr, B, Ni, Ru, Mo, Si, Ge, Nb, and Ta, wherein the concentration(s) of the at least one of Co and Fe in the alloy is (are) constant or varies (vary) across the thickness of the interface layer(s) from high near an interface with the non-magnetic spacer layer to low near an interface with a respective ferromagnetic layer.

In accordance with embodiments of the present invention, step (b) comprises:

($b_5$) forming the lower ferromagnetic layer of the at least one AFC component proximal the at least one surface of the substrate at a thickness in the range from about 2 to about 80 Å; and ($b_6$) forming the upper ferromagnetic layer of the at least one AFC component and each of the pair of vertically spaced-apart ferromagnetic layers of the at least one LM component at a thickness in the range from about 30 to about 200 Å; wherein:

each of the plurality of vertically adjacent, spaced-apart pairs of ferromagnetic layers of the layer stack comprises a CoCr alloy or a CoCr alloy with at least one additional element selected from the group consisting of Pt, Ta, B, Mo, Ru, Si, Ge, Nb, Fe, and Ni.

According to further embodiments of the present invention, the method further comprising steps of:

(c) forming seed and underlayers between the at least one surface of the non-magnetic substrate and the layer stack for controlling the crystallographic texture of the ferromagnetic layers; and (d) forming protective overcoat and lubricant topcoat layers on an uppermost surface of the layer stack; wherein:

the seed layer is formed at a thickness from about 10 to about 1,000 Å and comprises an amorphous or fine-grained material selected from the group consisting of Ni—Al, Fe—Al, Cr—Ti, Cr—Ta, Ta, Ta—W, Ru—Al, Co—Ti, and TaN; and the underlayer is formed at a thickness from about 10 to about 300 Å and comprises a polycrystalline layer of Cr or a Cr-based alloy.

Yet another aspect of the present invention is a high areal recording density longitudinal magnetic recording medium having improved thermal stability and signal-to-medium noise ratio ("SMNR"), comprising:

(a) a non-magnetic substrate having at least one surface; and (b) means overlying the at least one surface for providing vertically superposed anti-ferromagnetically coupled ("AFC") and laminated media ("LM") components.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition that high areal density, thin-film magnetic recording media, e.g., longitudinal recording media, having improved stability and signal-to-media noise ratio (SMNR), can be reliably and controllably manufactured by providing a stacked multilayer structure comprised of a plurality of vertically stacked ferromagnetic layers. According to the invention, the vertically stacked ferromagnetic layers are spaced-apart from each other by means of a non-magnetic spacer layer interposed between vertically adjacent pairs of ferromagnetic layers; and the thicknesses of the ferromagnetic and non-magnetic spacer layers are selected such that: (1) at least one of the plurality of vertically adjacent, spaced-apart pairs of ferromagnetic layers forms an anti-ferromagnetically coupled media ("AFC") component; and (2) at least one of the plurality of vertically adjacent, spaced-apart pairs of ferromagnetic layers forms a laminated media ("LM") component. The hybrid AFC+LM media fabricated according to the principles of the present invention combine the advantageous feature of enhanced stability provided by AFC media with the similarly advantageous feature of improved SMNR provided by LM media. The improvement in stability and SMNR afforded by the hybrid AFC+LM media according to the present invention, wherein the LM component is positioned in the layer stack above the AFC component, is attributed to a significant decrease (i.e., up to about 50%) in the demagnetization field ($H_d$), relative to the $H_d$ of LM media, and to an increase in the magnetic energy barrier of the magnetic grains in the main ferromagnetic layer of the AFC component due to the coupling with the bottom ferromagnetic layer of the AFC component.

The inventive methodology affords several advantages not obtainable according to the conventional art, including, inter alia, increased stability and SMNR of very high areal recording density, longitudinal magnetic media; and reliable, controllable, and cost-effective formation of very high areal density magnetic recording media with improved stability and SMNR, utilizing conventional manufacturing techniques and instrumentalities, e.g., sputtering techniques and apparatus.

Figure 2:
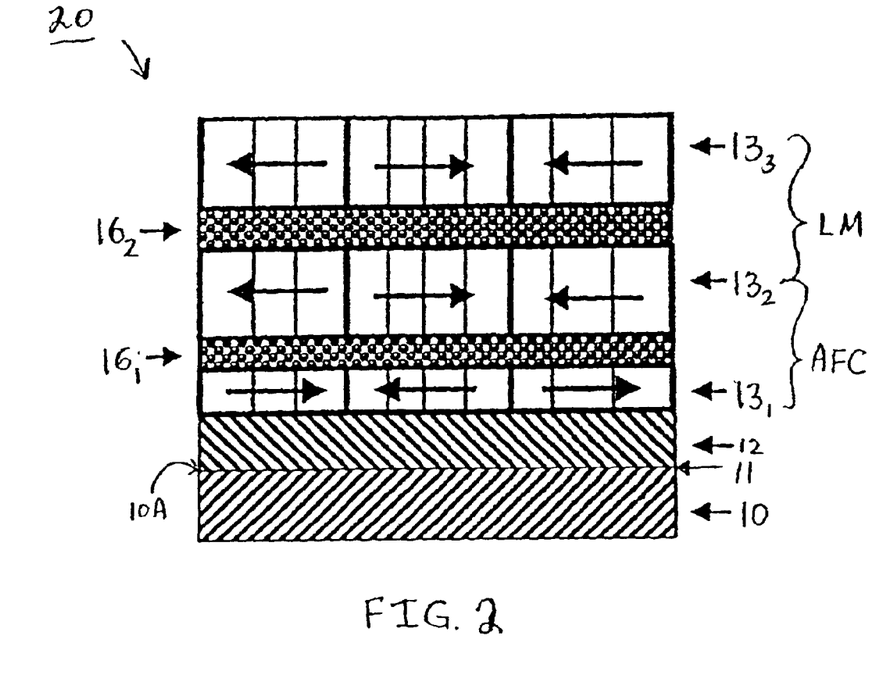
FIGS. 2-3 schematically illustrate, in simplified cross-sectional view, portions of embodiments of hybrid magnetic media according to the invention which include anti-ferromagnetically coupled (AFC) and laminated media (LM) portions.
Figure 3:
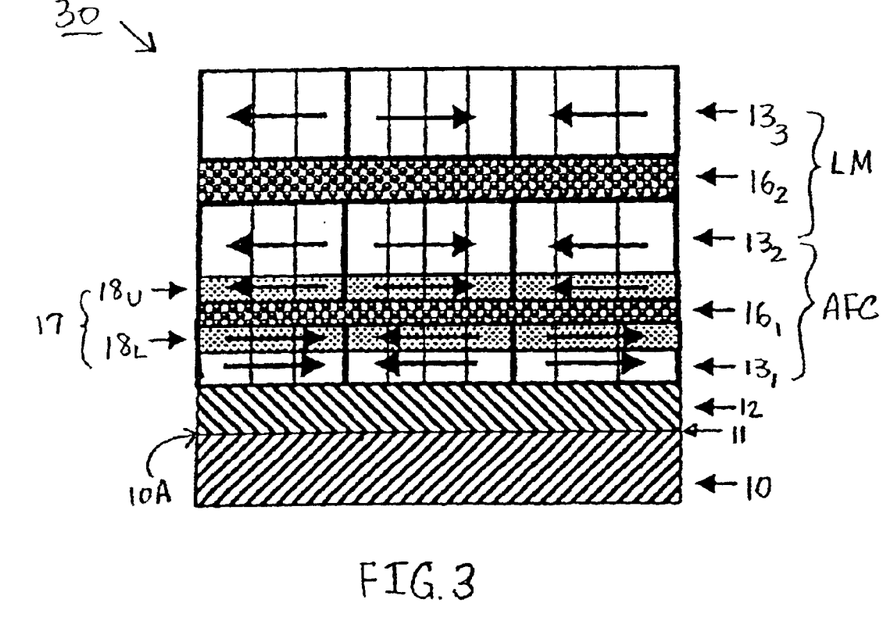

Referring to FIGS. 2-3, schematically illustrated therein, in simplified cross-sectional view, are embodiments of magnetic recording media embodying the inventive AFC+LM concept. A first embodiment of a hybrid AFC+LM magnetic recording medium 20 according to the invention is shown in FIG. 2 and includes a non-magnetic substrate 10 selected from among non-magnetic metals and alloys, Al, Al-based alloys such as Al—Mg alloys, NiP-plated Al ("Al/NiP"), glass, ceramics, polymers, and composites and laminates of the aforementioned materials. The thickness of substrate 10 is not critical; however, in the case of magnetic recording media for use in hard disk applications, substrate 10 must be of a thickness sufficient to provide the necessary rigidity. Substrate 10 typically comprises Al or an Al-based alloy, e.g., an Al—Mg alloy, and includes on the surface 10A thereof a plating layer 11, e.g., a layer of amorphous NiP. Formed on the plating layer 11 is an underlayer layer 12, for controlling the crystallographic texture and properties of ferromagnetic Co-based alloy layers deposited thereover, which underlayer 12 includes first, or lower, and second, or upper, portions 12A and 12B, respectively (as shown in FIG. 1), wherein the first, or lower portion 12A is a seed layer comprised of an amorphous or fine-grained material, e.g., a Ni—Al, Fe—Al, Cr—Ti, Cr—Ta, Ta, Ta—W, Ru—Al, Co—Ti, or TaN layer from about 10 to about 1,000 Å thick, and the second, or upper portion 12B is a polycrystalline underlayer, typically a Cr or Cr-based alloy layer (e.g., of Cr—W, Cr—Mo, CoCr, etc.) from about 10 to about 300 Å thick.

According to the invention, the single ferromagnetic layer 13 of the conventionally-structured magnetic recording medium 1 of FIG. 1 is replaced with a stacked multilayer structure comprising a plurality of vertically stacked, ferromagnetic layers, illustratively layers $13_1$, $13_2$, $13_3$, wherein vertically adjacent ferromagnetic layers of the stack are spaced-apart by a respective, non-magnetic spacer layer, illustratively layers $16_1$, $16_2$.

By way of illustration, but not limitation, according to the invention, each of the ferromagnetic layers $13_1$, $13_2$, $13_3$ may comprise a crystalline layer (or a plurality of ferromagnetic sub-layers) of at least one ferromagnetic alloy of Co .with at least one of Pt, Cr, B, Fe, Ta, Ni, Mo, V, Nb, W, Ru, and Ge; and each of the non-magnetic spacer layers $16_1$, $16_2$ may comprise a crystalline layer of a non-magnetic material selected from the group consisting of Ru, Rh, Ir, Cr, Cu, Re, V, and their alloys. According to the illustrated embodiment of the invention, the portion of the stacked multilayer structure comprised of the lower pair of spaced-apart ferromagnetic layers $13_1$ and $13_2$ and the respective non-magnetic spacer layer $16_1$ (hereinafter represented as $13_1/16_1/13_2$) forms an anti-ferromagnetically coupled (AFC) portion (or "component") of medium 20, wherein the thickness of the spacer layers is selected to provide maximum anti-ferromagnetic coupling between the spaced-apart ferromagnetic layers $13_1$ and $13_2$. In addition, the portion of the stacked multilayer structure comprised of the upper pair of spaced-apart ferromagnetic layers $13_2$ and $13_3$ and the respective non-magnetic spacer layer $16_2$ (hereinafter represented as $13_2/16_2/13_3$) forms a laminated media (LM) portion (or "component") of medium 20.

As may be apparent from FIG. 2, the thickness of lower ferromagnetic layer $13_1$ of the AFC portion $13_1/16_1/13_2$ of medium 20 is less than that of the upper ferromagnetic layer $13_2$ of the AFC portion $13_1/16_1/13_2$ (which layer $13_2$ is also the lower layer of the LM portion $13_2/16_2/13_3$) and less than that of the upper layer $13_3$ of the LM portion $13_2/16_2/13_3$. Similarly, the thickness of the non-magnetic spacer layer 16, of the AFC portion $13_1/16_1/13_2$ is, in general, less than that of the non-magnetic spacer layer of the LM portion $13_2/16_2/13_3$. By way of illustration only, the thickness of the lower ferromagnetic layer $13_1$ of the AFC portion $13_1/16_1/13_2$ of medium 20 proximal substrate 10 may be in the range from about 2 to about 80 Å, and the thickness of the upper ferromagnetic layer $13_2$ of the AFC portion $13_1/16_1/13_2$ (the lower layer of the LM portion $13_2/16_2/13_3$) and a upper layer $13_3$ of the LM portion $13_2/16_2/13_3$ are each in the range from about 30 to about 200 Å. The thickness of non-magnetic spacer layer $16_1$ of the AFC portion $13_1/16_1/13_2$ of medium 20 is in the range from about 2 to about 20 Å, preferably in the range from about 5 to about 10 Å, and the thickness of the non-magnetic spacer layer $16_2$ of the LM portion $13_2/16_2/13_3$ is in the range from about 4 to about 40 Å, preferably in the range from about 10 to about 30 Å.

Each of the layers of the hybrid magnetic medium 20, including those of the ferromagnetic and spacer layers $13_n$ and $16_n$ of the present invention, may be deposited or otherwise formed by any suitable physical vapor deposition technique (PVD), e.g., sputtering, or by a combination of PVD techniques, i.e., sputtering, vacuum evaporation, etc.

Protective overcoat and lubricant topcoat layers, respectively analogous to layers 14 and 15 shown in FIG. 1, are typically provided over the upper surface of the uppermost ferromagnetic layer $13_3$, in conventional fashion, e.g., as by sputtering and dipping, respectively, which layers 14 and 15 are not shown in FIGS. 2-3 in order not to unnecessarily obscure the key features of the invention.

Another embodiment of a magnetic recording medium 30 according to the invention is schematically illustrated in FIG. 3, which embodiment is similar in essential respect to embodiment 20 of FIG. 2 and also comprises a vertically stacked plurality of ferromagnetic layers $13_1$, $13_2$, and $13_3$, wherein each of the vertically adjacent ferromagnetic layers may be constituted as described above with respect to FIG. 2, and separated by a respective non-magnetic spacer layer $16_1$, $16_2$. However, according to this embodiment, spacer layer $16_1$ of the lower AFC portion $13_1/16_1/13_2$ of the medium is replaced by a structure 17 comprising the crystalline, thin, non-magnetic spacer layer $16_1$ and at least one thin, ferromagnetic interface layer $18_U$, $18_L$ at at least one of the upper and/or lower interfaces between the spacer layer 16, and ferromagnetic layers $13_1$ and $13_2$ for increasing the coupling of the ferromagnetic layers across the spacer layer. By way of illustration only, each of the lower and upper, thin, ferromagnetic interface layers $18_L$, $18_U$ may comprise a ferromagnetic material having a saturation magnetization value $M_s$>400 emu/cc, e.g., an about 1 monolayer to an about 40 Å thick layer, preferably from about 2 to about 20 Å thick, of at least one of Co and Fe or their alloys with at least one of Pt, Cr, B, Ni, Ru, and Ta, wherein the concentration(s) of the at least one of Co and Fe in the alloy is (are) constant or varies (vary) across the thickness of the interface layers $18_L$ and/or $18_U$ from high near an interface with the non-magnetic spacer layer 16 to low near an interface with a ferromagnetic layer $13_n$. As before, each of the layers of the magnetic medium 30, including those of the coupling/spacer layer structure 17, may be deposited or otherwise formed by any suitable physical vapor deposition ("PVD") technique, e.g., sputtering, or by a combination of PVD techniques, i.e., sputtering, vacuum evaporation, etc.

EXAMPLES

Media designs according to the inventive principles were sputtered onto Al/NiP substrates having a circumferential mechanical texture. Static sputter processing was performed utilizing an Intevac MDP 250B apparatus. The media included a CrW sublayer, a paramagnetic hexagonal interlayer (equivalent to the aforementioned seed and underlayers), and CoCrPtB ferromagnetic layers. Ru non-magnetic spacer layers were utilized in the fabrication of the investigated LM, AFC, and hybrid AFC+LM media structures. The thickness of the Ru spacer layers was varied from ~8 Å in the AFC structures to achieve maximum anti-ferromagnetic coupling, to greater than about 12 Å in the LM structures. A 35 Å thick protective overcoat was magnetron sputtered over the film structures for corrosion protection. Signal-to-media noise ratios ("SMNR" or "SNR") were measured for linear densities up to 600 kfci, and thermal decay rates were measured as described by H. J. Richter and R. M. Brockie in *IEEE Trans. on Magnetics*.

In general, the ferromagnetic recording layer of longitudinal recording media is comprised of weakly coupled single-domain grains. The magnetic energy of each single-domain grain, in the absence of an applied magnetic field (i.e., at zero applied field), is equal to KV, where K is the anisotropy constant and V is the volume of the grain. Due to interactions between the grains in the recording layer (i.e., primarily direct exchange and dipole-dipole interactions), the magnetic energy of the grains is modified, i.e., changed to an effective magnetic energy, $E_{Meff}$.

Figure 4:
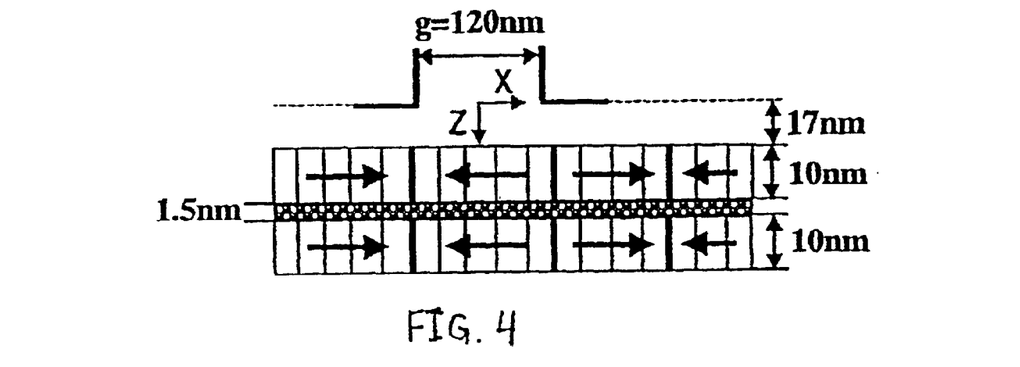
FIG. 4 is a schematic, cross-sectional representation of a system including a ring-shaped recording head (RH) overlying a laminated magnetic recording medium (LM) including a top magnetic layer (TL) and a bottom magnetic layer (BL) separated by a non-magnetic spacer layer (SL)
Figure 5:
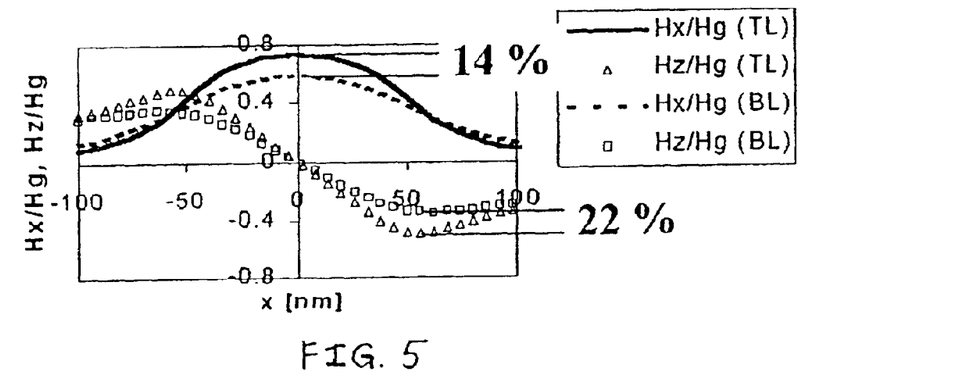
FIG. 5 is a graph for showing the variation of the in-plane and out-of-plane components x and y, respectively, of the field from the RH acting on the TL and BL of the LM of FIG. 4, as a function of x.

In laminated media ("LM"), a non-magnetic spacer layer vertically separates pairs of ferromagnetic layers, and $E_{Meff}$ of the grains in the paired ferromagnetic layers is much larger than the exchange energy across the non-magnetic spacer layer ("SL"). As a consequence, it may be assumed that the magnetic layers switch independently. In the following discussion, for simplicity the magnetic layer of the LM closer to the recording head is referred to as the top layer ("TL") and the other magnetic layer further from the recording head is referred to as the bottom layer ("BL"). Further, the thickness and remanent magnetization ($M_r$) of the TL and BL are assumed to be equal. A schematic, cross-sectional representation of a system including such a LM and a ring-shaped recording head ("RH") is shown in FIG. 4, wherein an estimate of the head field as a function of distance or spacing from the TL can be calculated using the Klarquist approximation (*Trans. Royal Soc. Technol.* (Stockholm) 86, 1 1954)), wherein the head gap was assumed as ~120 nm, the spacing between the RH and the TL was assumed to be ~17 nm, the thickness of the TL and BL was taken as ~10 nm, and the SL thickness was assumed to be ~1.5 nm. As is evident from the graph of FIG. 5 showing the variation of the in-plane and out-of-plane components x and y, respectively, of the field from the RH acting on the TL and BL of the LM of FIG. 4, as a function of x, the in-plane and out-of-plane components of the head field acting on the BL are reduced by 14 and 22%, respectively, compared to the head field acting on the TL, which reduction in head field significantly limits the coercivity of the BL.

Figure 6:
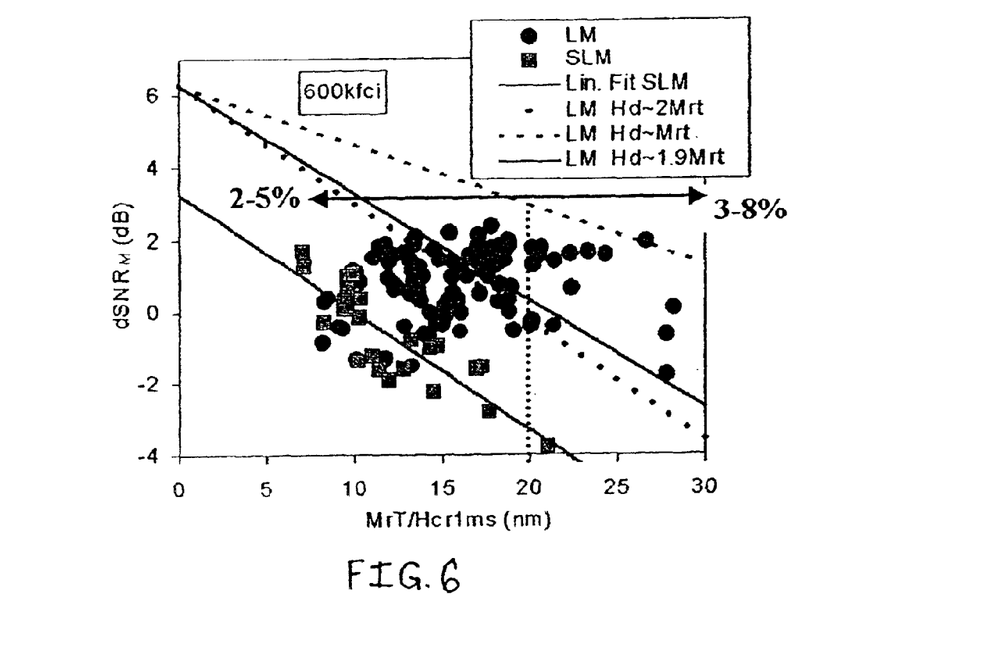
FIG. 6 is a graph for comparing the variation of the signal-to-noise ratio (SNR) of single layer media (SLM) and laminated media (LM) as a function of $M_r t / H_{cr}$.

The SMNR and thermal decay of magnetic media depend upon the proportionality of $H_d/H_{cr}$ to $M_r t/H_c$, where $H_d$ is the demagnetization field, $H_{cr}$ is the remanent coercivity, which is about one-half of the anisotropy field $H_A$ at the instant of writing, $M_r$ is the remanent magnetization, and t is the total thickness of the magnetic layers involved in the writing process. For an understanding of the recording properties of LM, it is necessary to calculate $H_d$ for each magnetic layer of the laminate. Using non-magnetic spacer layer thicknesses of 1.5 and 3 nm, $H_d$ was calculated to be 92 and 84%, respectively, of the $H_d$ of a single layer medium (SLM) with $2M_{r1}t_1$, where it is assumed that $M_{r1}$ and $t_1$ are the remanent magnetization and thickness of each layer in the LM. FIG. 6 is a graph comparing the variation of the SNR of the SLM and the LM as a function of $M_r t/H_{cr}$, wherein the two dashed lines shown therein were constructed in the following manner: the first dashed line is drawn such that the SNR of the LM is equal to the SNR of the SLM with $2M_{r1}t_1$+3 dB, assuming that the TL and BL are in contact with each other to form the SLM; and the second dashed line is drawn such that the SNR of the LM is equal to the SNR of the SLM with $M_{r1}t_1$+3 dB. In the latter case, the TL and BL of the LM are far apart, and as a consequence, there is no increase in $H_d$ due to magnetostatic interaction between the two magnetic layers. The SNR of the SLM is obtained from a linear fit of SNR ($M_r t/H_{cr}$) of the SLM and is shown as the light solid line in FIG. 6. The heavy solid line shown in FIG. 6 is constructed from equating the SNR of the LM with the SNR of a SLM with 1.9 $M_{r1}t_1$+3 dB, and is the SNR expected for a LM with a 2 nm thick non-magnetic spacer layer. FIG. 6 indicates that for $M_r t/H_{cr}$>20 nm, the SNR of the LM falls between the first and second dashed lines, whereas for $M_r t/H_{cr}$<20 nm, the SNR of the LM decreases. The thermal decay rates for most of the investigated LM with $M_r t/H_{cr}$>20 nm are between about 2 to about 5%/decade, and for LM with $M_r t/H_{cr}$<20 nm, the thermal decay rates are between about 3 and about 8%/decade. Thus, the decrease in SNR of LM with $M_r t/H_{cr}$<20 nm is attributable to the increase in thermal decay rates for samples with low $M_r t/H_{cr}$. In addition, for most LM with $M_r t/H_{cr}$>20 nm, the SNR is larger than that calculated assuming a decrease in $H_d$ due to the separation between the TL and BL, as indicated by the heavy solid line. If the written bits in the TL and BL are not exactly vertically aligned, $H_d$ is reduced, which effect may be responsible for the observed increase in the SNR of LM with $M_r t/H_{cr}$>20 nm.

Figure 7:
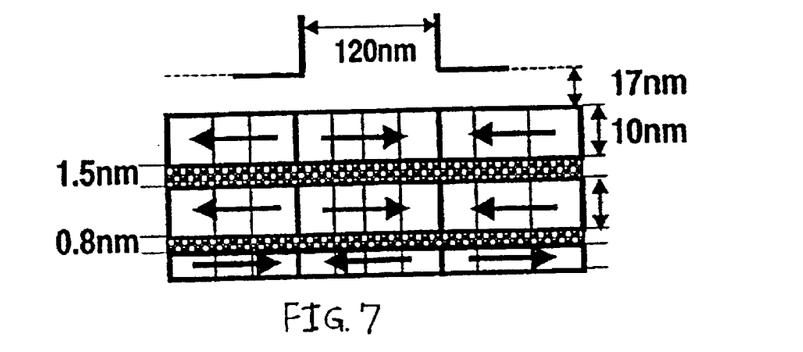
FIG. 7 is a schematic, cross-sectional representation of a system including a ring-shaped recording head (RH) overlying a hybrid anti-ferromagnetically coupled and laminated ("AFC+LM") magnetic recording medium according to the invention, comprising a lower, AFC portion and an upper LM portion.
Figure 8:
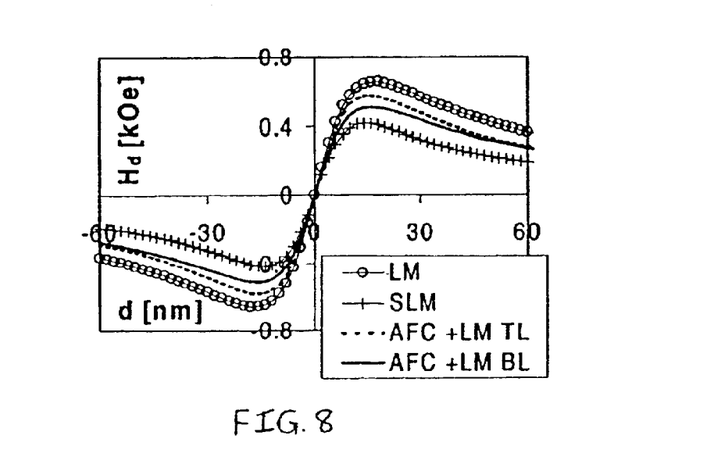
FIG. 8 is a graph for comparing the stability (in terms of the strength of the demagnetization field $H_d$) of SLM, LM, and the TL and BL of hybrid AFC+LM media according to the invention.

According to the invention, AFC media were combined with LM media in order to improve the stability of the latter at lower values of $M_r t/H_{cr}$, wherein the resulting hybrid AFC+LM media were expected to exhibit a high SNR due to the LM component along with the increased stability afforded by the AFC component. FIG. 7 is a schematic, cross-sectional representation of a system including a ring-shaped recording head (RH) overlying a hybrid AFC+LM magnetic recording medium according to the invention, comprising a layer stack including a lower, AFC portion and an upper, LM portion, each portion of the layer stack being comprised of a pair of ferromagnetic layers vertically spaced apart by a non-magnetic spacer layer. Related FIG. 8 graphically compares the stability (in terms of the strength of the demagnetization field $H_d$) of SLM, LM, and the TL and BL of hybrid AFC+LM media according to the invention, wherein the AFC+LM structure of FIG. 7 with the AFC portion positioned below the LM portion is assumed.

Figure 9:
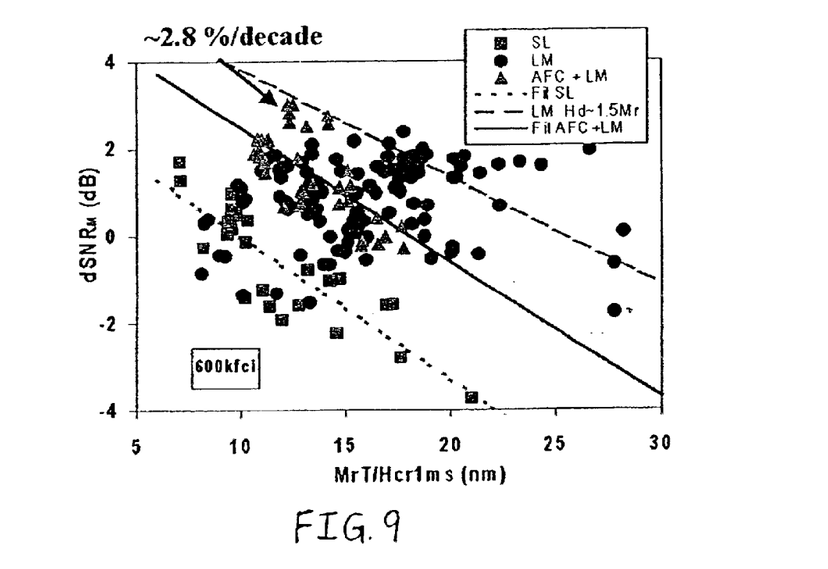
FIG. 9 is a graph for comparing the signal-to-noise ratio (SNR) performance of SLM, LM, and hybrid AFC+LM media according to the invention, as a function of $M_r t / H_{cr}$.

FIG. 9 graphically compares the signal-to-noise ratio (SNR) performance of SLM, LM, and hybrid AFC+LM media according to the invention, as a function of $M_r t/H_{cr}$. An improvement of ~1 dB in SNR was observed for the hybrid AFC+LM media when compared with the SLM. Thermal decay rates for most of the investigated hybrid AFC+LM designs with $M_r t/H_{cr}$<20 nm were between about 2 and about 5%/decade, which compares favorably with the decay rates between about 3 to about 9%/decade of LM in the same $M_r t/H_{cr}$ range. The improvement in stability of the hybrid AFC+LM configuration is attributed to the decrease in $H_d$ provided by the AFC component, which decrease in $H_d$ is calculated to range as high as about 50% of the $H_d$ of the LM for some of the experimentally investigated hybrid AFC+LM configurations. In AFC media, the magnetic energy barrier of the recording layer which must be overcome during magnetization reversal is increased due to the coupling with the stabilization layer, which effect is advantageously utilized in the hybrid AFC+LM media according to the invention.

A narrow value of $PW_{50}$ is very important for achieving high density magnetic recording media, and in all cases, i.e., in SLM, AFC, LM, and hybrid AFC+LM, media designs with the same net values of $M_r t$ assume the same saturation magnetization and crystallographic orientation of the magnetic layers. LM with low net values of $M_r t$, hence narrow $PW_{50}$, are difficult to stabilize. However, stabilization of the $PW_{50}$ is possible with the inventive hybrid AFC+LM structure.

The present invention thus advantageously provides high quality, thermally stable, high areal recording density magnetic recording media, which media achieve high SMNR and improved thermal stability via a stacked plurality of ferromagnetic recording layers vertically spaced apart by non-magnetic spacer layers, wherein the thicknesses of various of the ferromagnetic and non-magnetic spacer layers are selected to provide the media with an anti-ferromagnetically coupled (AFC) portion and a laminated media (LM) portion, whereby the resultant hybrid media exhibit the respective benefits attributable to each of the AFC and LM portions. Moreover, the inventive methodology can be practiced in a cost-effective manner, utilizing conventional manufacturing technology and equipment (e.g., sputtering technology/equipment) for automated, large-scale manufacture of magnetic recording media, such as hard disks. Finally, the invention is not limited to use with hard disks, but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A longitudinal magnetic recording medium having improved thermal stability and signal-to-medium noise ratio ("SMNR"), comprising:
   (a) a non-magnetic substrate having at least one surface;
   (b) a layer stack overlying said at least one surface, said layer stack comprising a plurality of vertically spaced-apart ferromagnetic layers, each vertically adjacent pair of said ferromagnetic layers being spaced-apart by a respective non-magnetic spacer layer, wherein:
      (i) at least one of said plurality of vertically adjacent, spaced-apart pairs of ferromagnetic layers forms an anti-ferromagnetically coupled media ("AFC") component of said magnetic recording medium, said AFC component comprising an upper and lower ferromagnetic layer wherein the lower ferromagnetic layer has a thickness less than that of the upper ferromagnetic layer; and
      (ii) at least one of said plurality of vertically adjacent, spaced-apart pairs of ferromagnetic layers forms a laminated media ("LM") component of said magnetic recording medium; and
   (c) a protective overcoat layer directly on an upper surface of the uppermost ferromagnetic layer of said LM component.

2. The magnetic recording medium as in claim 1, wherein: said at least one LM component (ii) is positioned in said layer stack (b) above said at least one AFC component (i).

3. The magnetic recording medium as in claim 1, wherein: the thickness of the non-magnetic spacer layer of said at least one AFC component (i) is such that the anti-ferromagnetic coupling between the respective pair of vertically spaced-apart ferromagnetic layers are maximized; and
the thickness of the non-magnetic spacer layer of said at least one LM component (ii) is such that the energy of any magnetic coupling between the respective pair of vertically spaced-apart ferromagnetic layers is smaller than the magnetic energy of the magnetic grains in said ferromagnetic layers.

4. The magnetic recording medium as in claim 3, wherein:
   the thickness of said non-magnetic spacer layer of said AFC component (i) is in the range from about 2 to about 20 Å; and
   the thickness of said non-magnetic spacer layer of said LM component (ii) is in the range from about 4 to about 40 Å.

5. The magnetic recording medium as in claim 4, wherein:
   the thickness of said non-magnetic spacer layer of said AFC component (i) is in the range from about 5 to about 10 Å; and
   the thickness of said non-magnetic spacer layer of said LM component (ii) is in the range from about 10 to about 30 Å.

6. The magnetic recording medium as in claim 3, wherein:
   each of said non-magnetic spacer layers comprises a material selected from the group consisting of Ru, Rh, Ir, Cr, Cu, Re, V, and their alloys.

7. The magnetic recording medium as in claim 3, further comprising: a ferromagnetic interface layer at at least one interface between the non-magnetic spacer layer and the respective pair of vertically spaced-apart ferromagnetic layers of said at least one AFC component (i) for increasing the coupling between the ferromagnetic layers.

8. The magnetic recording medium as in claim 7, wherein:
   each of said ferromagnetic interface layers comprises an about 1 monolayer thick to an about 40 Å thick layer of a ferromagnetic material having a saturation magnetization value $M_s > 400$ emu/cc.

9. The magnetic recording medium as in claim 8, wherein:
   each of said ferromagnetic interface layers comprises at least one of Co and Fe or their alloys with at least one of Pt, Cr, B, Ni, Ru, Mo, Si, Ge, Nb, and Ta, wherein the concentration(s) of the at least one of Co and Fe in the alloy is (are) constant or varies (vary) across the thickness of the interface layer(s) from high near an interface with the non-magnetic spacer layer to low near an interface with a respective ferromagnetic layer.

10. The magnetic recording medium as in claim 1, wherein:
   the thickness of the lower ferromagnetic layer of said at least one AFC component (i) proximal said at least one surface of said substrate (a) is in the range from about 2 to about 80 Å; and
   the thickness of the upper ferromagnetic layer of said at least one AFC component (i) and of each of the pair of vertically spaced-apart ferromagnetic layers of said at least one LM component (ii) is in the range from about 30 to about 200 Å.

11. The magnetic recording medium as in claim 10, wherein:
   each of said plurality of vertically adjacent, spaced-apart pairs of ferromagnetic layers of said layer stack (b) comprises a CoCr alloy or a CoCr alloy with at least one additional element selected from the group consisting of Pt, Ta, B, Mo, Ru, Si, Ge, Nb, Fe, and Ni.

12. The magnetic recording medium as in claim 1, further comprising:
   (d) seed and underlayers between said at least one surface of said non-magnetic substrate (a) and said layer stack (b) for controlling the crystallographic texture of said ferromagnetic layers; and (e) a lubricant topcoat layer provided on an upper surface of said protective overcoat.

13. The magnetic recording medium as in claim 10, wherein:

said seed layer is from about 10 to about 1,000 Å thick and comprises an amorphous or fine-grained material selected from the group consisting of Ni—Al, Fe—Al, Cr—Ti, Cr—Ta, Ta, Ta—W, Ru—Al, Co—Ti, and TaN; and said underlayer is from about 10 to about 300 Å thick and comprises a polycrystalline layer of Cr or a Cr-based alloy.

14. The magnetic recording medium as in claim 1, wherein said LM component of said magnetic recording medium comprises at least one single ferromagnetic layer that is not anti-ferromagnetically coupled with an adjacent ferromagnetic layer.

15. A method of forming a magnetic recording medium having improved thermal stability and signal-to-media noise ratio ("SMNR"), comprising steps of:

(a) providing a non-magnetic substrate having at least one surface adapted for layer formation thereover;

(b) forming a layer stack overlying said at least one surface, said layer stack comprising a plurality of vertically spaced-apart ferromagnetic layers, vertically adjacent pairs of said ferromagnetic layers being spaced-apart by respective non-magnetic spacer layers, wherein:

at least one of said plurality of vertically adjacent, spaced-apart pairs of ferromagnetic layers forms an anti-ferromagnetically coupled media ("AFC") component of said magnetic recording medium, said AFC component comprising an upper and lower ferromagnetic layer wherein the lower ferromagnetic layer has a thickness less than that of the upper ferromagnetic layer; and at least one of said plurality of vertically adjacent, spaced-apart pairs of ferromagnetic layers forms a laminated media ("LM") component of said magnetic recording medium; and (c) providing a protective overcoat layer directly on an upper surface of the uppermost ferromagnetic layer of said LM component.

16. The method according to claim 15, wherein step (b) comprises:

($b_1$) forming said layer stack such that said at least one LM component is positioned in said layer stack above said at least one AFC component;

($b_2$) forming the non-magnetic spacer layer of said at least one AFC component at a thickness such that the anti-ferromagnetic coupling between the respective pair of vertically spaced-apart ferromagnetic layers are maximized; and ($b_3$) forming the non-magnetic spacer layer of said at least one LM component at a thickness such that the energy of any magnetic coupling between the respective pair of vertically spaced-apart ferromagnetic layers is smaller than the magnetic energy of the magnetic grains in said ferromagnetic layers.

17. The method according to claim 16, wherein step (b) comprises:

($b_2$) forming said non-magnetic spacer layer of said AFC component at a thickness in the range from about 2 to about 20 Å; and ($b_3$) forming said non-magnetic spacer layer of said LM component at a thickness in the range from about 4 to about 40 Å, wherein:

each of said non-magnetic spacer layers of said layer stack comprises a material selected from the group consisting of Ru, Rh, Ir, Cr, Cu, Re, V, and their alloys.

18. The method according to claim 16, wherein step (b) further comprises:

($b_4$) forming a ferromagnetic interface layer at at least one interface between the non-magnetic spacer layer and the respective pair of vertically spaced-apart ferromagnetic layers of said at least one AFC component for increasing the RKKY-type coupling between the ferromagnetic layers, wherein:

each of said ferromagnetic interface layers comprises an about 1 monolayer thick to an about 40 Å thick layer of a ferromagnetic material having a saturation magnetization value $M_s > 400$ emu/cc, said ferromagnetic material comprising at least one of Co and Fe or their alloys with at least one of Pt, Cr, B, Ni, Ru, Mo, Si, Ge, Nb, and Ta, wherein the concentration(s) of the at least one of Co and Fe in the alloy is (are) constant or varies (vary) across the thickness of the interface layer(s) from high near an interface with the non-magnetic spacer layer to low near an interface with a respective ferromagnetic layer.

19. The method according to claim 15, wherein step (b) comprises:

($b_5$) forming the lower ferromagnetic layer of said at least one AFC component proximal said at least one surface of said substrate at a thickness in the range from about 2 to about 80 Å; and ($b_6$) forming the upper ferromagnetic layer of said at least one AFC component and each of the pair of vertically spaced-apart ferromagnetic layers of said at least one LM component at a thickness in the range from about 30 to about 200 Å; wherein:

each of said plurality of vertically adjacent, spaced-apart pairs of ferromagnetic layers of said layer stack comprises a CoCr alloy or a CoCr alloy with at least one additional element selected from the group consisting of Pt, Ta, B, Mo, Ru, Si, Ge, Nb, Fe, and Ni.

20. The method according to claim 15, further comprising steps of:

(d) forming seed and underlayers between said at least one surface of said non-magnetic substrate and said layer stack for controlling the crystallographic texture of said ferromagnetic layers; and (e) forming a lubricant topcoat layer on an uppermost surface of said protective overcoat layer; wherein:

said seed layer is formed at a thickness from about 10 to about 1,000 Å and comprises an amorphous or fine-grained material selected from the group consisting of Ni—Al, Fe—Al, Cr—Ti, Cr—Ta, Ta, Ta—W, Ru—Al, Co—Ti, and TaN; and said underlayer is formed at a thickness from about 10 to about 300 Å and comprises a polycrystalline layer of Cr or a Cr-based alloy.

21. The magnetic recording medium as in claim 15, wherein said LM component of said magnetic recording medium comprises at least one single ferromagnetic layer that is not anti-ferromagnetically coupled with an adjacent ferromagnetic layer.

* * * * *